Jan. 25, 1949.　　　　E. D. VANCIL ET AL　　　　2,459,976
MILLING MACHINE TRANSMISSION AND CONTROL
Filed March 6, 1944　　　　　　　　　　　　　　5 Sheets-Sheet 5

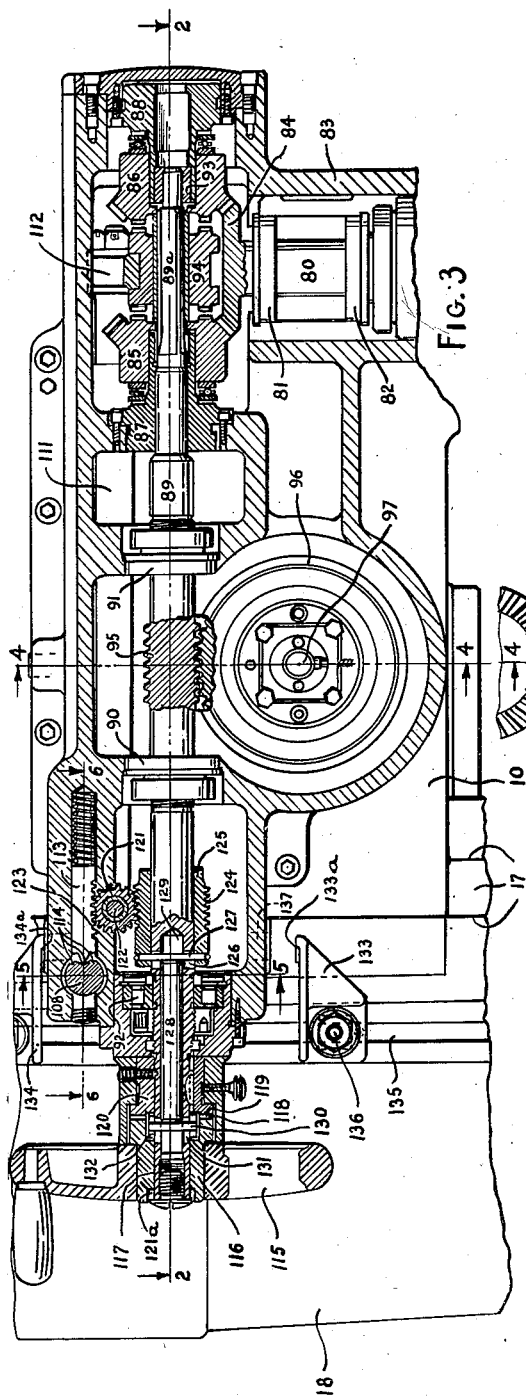

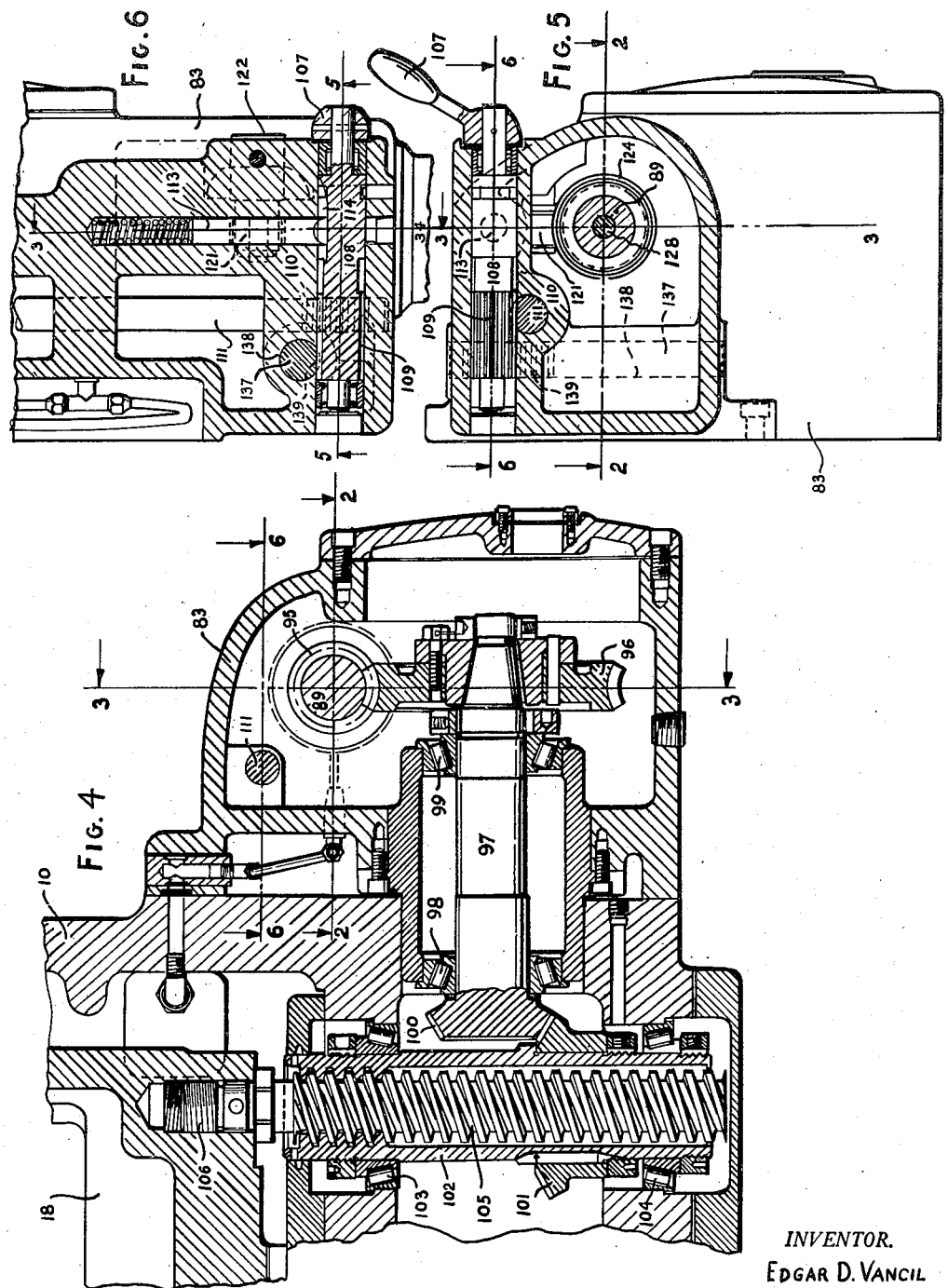

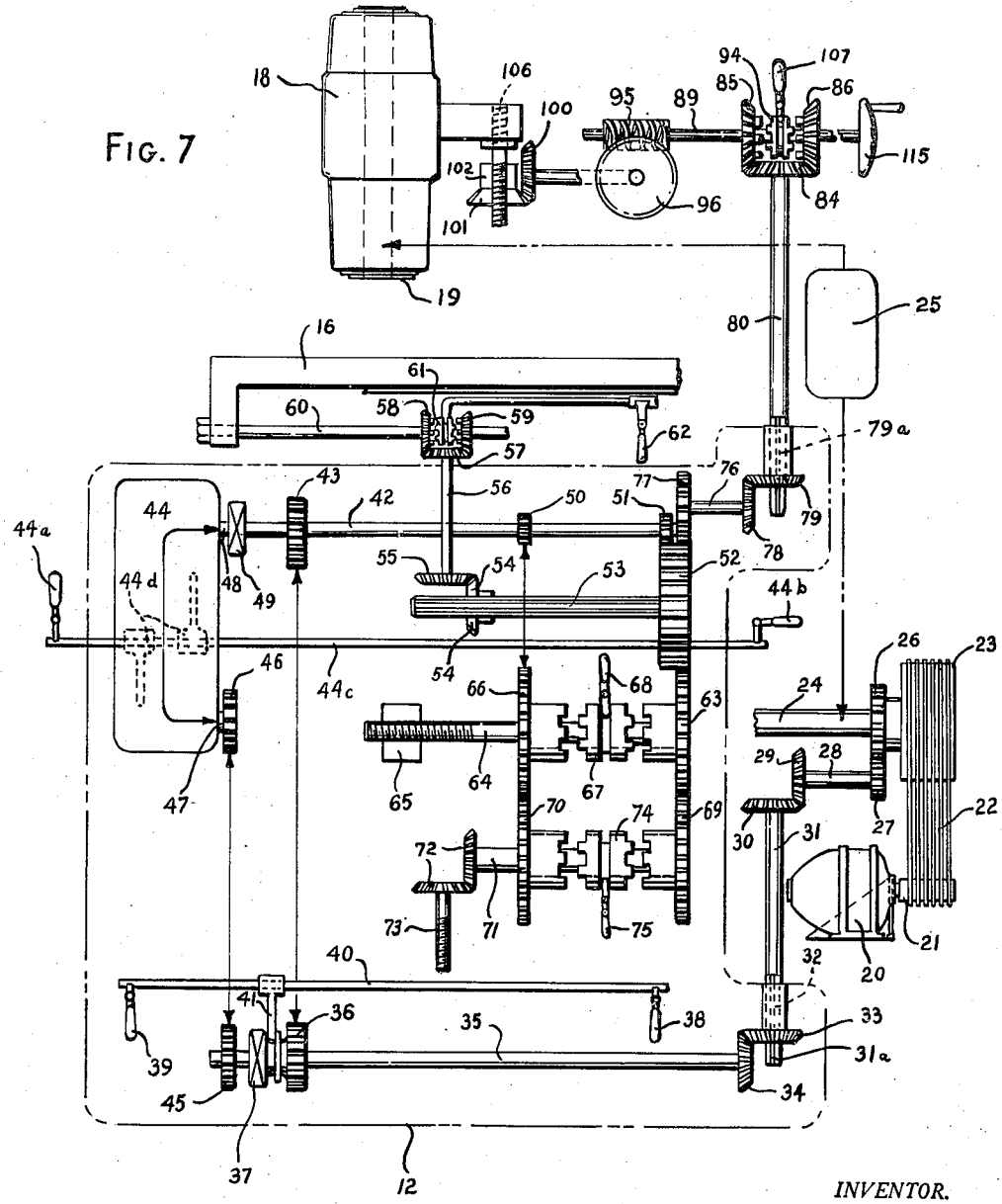

INVENTOR.
EDGAR D. VANCIL
FRED A. HASSMAN
BY Leigh W. Wright.
ATTORNEY.

Patented Jan. 25, 1949

2,459,976

UNITED STATES PATENT OFFICE

2,459,976

MILLING MACHINE TRANSMISSION AND CONTROL

Edgar D. Vancil and Fred A. Hassman, Cincinnati, Ohio, assignors to The Cincinnati Milling Machine Co., Cincinnati, Ohio, a corporation of Ohio Application March 6, 1944, Serial No. 525,282

1 Claim. (Cl. 90—21)

This invention pertains to transmission and control mechanism for milling machines.

One of the principal objects of this invention is to provide an improved feed and rapid traverse transmission for a vertical spindle sliding head knee and column type milling machine.

Another object is to provide in a milling machine, having a movable work holder with a change feed and rapid traverse transmission located therein, an improved mechanism to effect feed and rapid traverse movements in the work holder and spindle carrier.

And still another object of this invention is to provide in a milling machine having a knee, saddle, and table, and a spindle head movable on the column of the machine with a change feed and rapid traverse transmission in the knee, an improved means for selectively connecting said transmission to actuate said knee, saddle, table and head in relative feed and rapid traverse movements.

And a further object is to provide a milling machine of the vertical spindle sliding head knee and column type having a change feed and rapid traverse transmission in the knee, improved means controlled by operating devices on the work supporting members of the machine for effecting power actuation of the sliding head in feed and rapid traverse movements.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claim, without departing from or exceeding the spirit of the invention.

Referring to the drawings in which like reference numerals indicate like or similar parts:

Figure 2 is an enlarged fragmentary horizontal section of the vertical spindle head actuating mechanism on the line 2—2 of Figures 1, 3, 4, and 5.

Figure 3 is a vertical enlarged fragmentary section on the line 3—3 of Figures 2, 4, 5, and 6.

Figure 4 is a fragmentary enlarged section on the line 4—4 of Figures 1, 2, and 3.

Figure 5 is a fragmentary enlarged section on the line 5—5 of Figures 1, 2, 3, and 6.

Figure 6 is a fragmentary enlarged section on the line 6—6 of Figures 1, 3, and 5.

Figure 7 is a diagram showing the transmission gearing applied to the milling machine incorporating the features of this invention.

In machine tools and in particular in a milling machine it is necessary to provide a series of movable machine elements which may be actuated at a plurality of feed rates and at rapid traverse rates to effect relative motion of work and tool to perform a machining or milling operation. The problem of providing an efficient and simple actuating transmission mechanism for effecting these relative movements is complicated by the large variation in rates of movement of these members and that the members are each movable relative to each other. An appropriate driving transmission must be provided incorporating these large speed variations and which will also permit freedom of movement of these members relative to each other.

In providing an operating transmission for these members difficulty is encountered with the flexibility and yieldability inherent in such a transmission capable of wide speed variations and accommodation for relative movements of the members to be actuated. As a result, inaccurate machining operations, chatter, and vibration occur in the machine tool, causing imperfect work to be performed by the machine. Therefore, in order to minimize these deleterious effects a change feed and rapid traverse transmission is provided which is located in the knee of the milling machine and which is driven by a single constantly operating shaft driven by a prime mover located in the frame or column of the machine to in this way provide a simple power transmission from the prime mover to the mechanism in the knee readily adapted to accommodate itself to the relative movement of the knee on the machine column. This single drive shaft is continuously operated at relatively high speeds to reduce the overall size required for the shaft for the power to be transmitted, which results in reduced cost of manufacture.

In thus providing an efficient change feed and rapid traverse transmission in the knee for the work holding members of the milling machine the problem of providing actuating mechanism for the sliding head or vertical spindle carrier must also be met. This provision is met by effecting a drive to the spindle carrier directly from the feed and rapid traverse transmission mechanism in the knee and by providing controls associated with the knee and work holding members of the machine to effect the appropriate desired operation in the spindle carrier.

Figure 1:
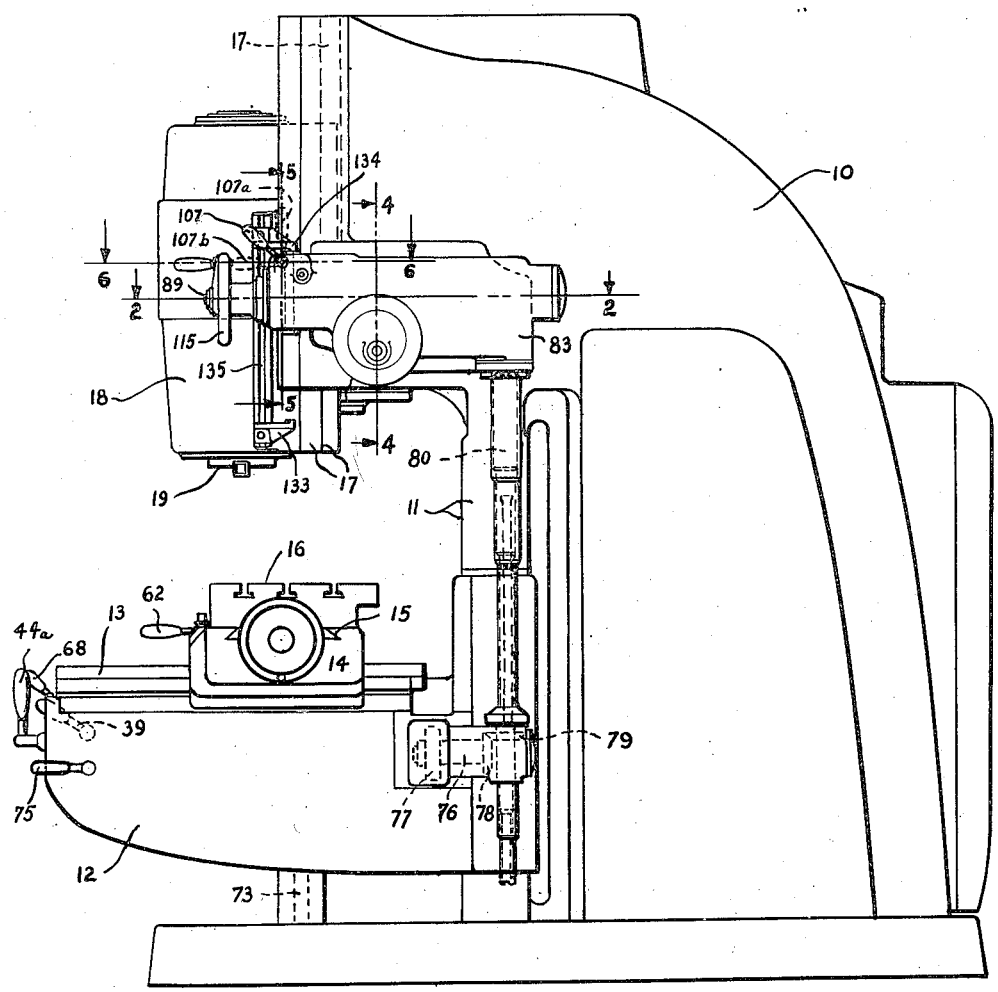
Figure 1 is a right hand side elevational view of a typical vertical spindle sliding head, knee and column type milling machine embodying the features of this invention.

For purposes of illustrating an exemplary embodiment of this invention, there is shown, Figure 1, a typical knee and column type milling machine having a column 10 having appropriate vertical guideways 11 upon which is vertically slidably mounted the knee 12 and on top of which knee is provided guideways 13 carrying the saddle 14 for transverse movement in and out relative to the column 10. On guideways 15 formed in the saddle 14 is slidably mounted the work table 16 for reciprocation normal to the traverse movement of the saddle 14 on the knee. Mounted on appropriate guideways 17 on the upper portion of the column 10 is the vertical spindle carrier or sliding head 18 carrying the vertically journaled cutter spindle 19.

The power for actuating the machine is derived from a prime mover or motor 20, Figure 7, having a motor pulley 21 driving suitable belts 22 for continuously rotating the main drive pulley 23. This pulley 23 contains a conventional clutch and brake mechanism for effecting driving or stopping of rotation of the main spindle drive shaft 24. This drive shaft 24 is connected through a conventional change speed spindle transmission indicated diagrammatically at 25 to rotate the cutter spindle 19 at appropriate cutting speeds. Since the specific detailed structure of this change speed spindle transmission forms no particular part of this invention, no further detailed description of this mechanism is deemed necessary.

The drive for effecting the feed and rapid traverse movements of the work holding mechanism comprising the knee 12, the saddle 14, and the table 16, and the tool carrier comprising the vertical spindle carrier or head 18, is derived from the gear 26, Figure 7, connected to the constantly rotating pulley 23 driven by the prime mover 20. The gear 26, in turn, drives a gear 27 mounted on a shaft 28 journaled in the column 10 of the machine. This shaft 28 in turn carries a bevel gear 29 which drives a mating bevel gear 30 fixed to the vertical splined drive shaft 31 journaled against axial movement in the column 10 of the machine. The shaft 31 has a splined portion 31a slidably mounted in driving relationship in the bore 32 of the bevel gear 33 journaled against axial movement in the knee 12 so that the gear 33 may be driven at all times for any relative vertical position of the knee 12 on the guideways 11 of the column 10 of the machine. The bevel gear 33 in turn drives a mating bevel gear 34 fixed on the input drive shaft 35 journaled in the knee 12.

It can thus be seen that all power for effecting feed and rapid movements is derived from the prime mover 20 and transmitted through the single power transmission train comprising the gears 26—27, shaft 28, gears 29—30, shaft 31, gears 33—34 to the input shaft 35. Thus, the single shaft 31 provides the complete feed and rapid traverse drive to the knee for effecting all of the feed and rapid traverse movements of the movable work and tool carrying members of the milling machine. It will be noted that this single power train or shaft 31 is constantly driven at a uniform rate and is preferably driven at a relatively high rate so as to transmit relatively large amounts of power with relatively small sized shafts and gears, thus minimizing the material consumption in constructing the mechanism. It is also to be noted that this single input drive is constantly operating at a uniform speed regardless of the rate of feed being utilized or whether rapid transverse movements are being effected for any of the movable members of the machine.

In the knee 12, Figure 7, is provided a feed and rapid traverse transmission which receives driving power from the shaft 35. The rapid traverse portion of the transmission comprises a gear 36 freely journaled on the shaft 35 and connectable or disconnectable from driving relationship with the shaft by means of a suitable clutch 37 which may be actuated by appropriate control levers 38 and 39 mounted on the knee 12 at the front and rear thereof for convenience of the operator. These control levers 38 and 39 may be connected through an operating rod 40 slidably mounted in the knee 12 which in turn actuates a shifting lever 41 for appropriately actuating the rapid traverse clutch 37 to cause the gear 36 to be rotated by the shaft 35 or to be disconnected therefrom. The gear 36 is constantly in mesh with the gear 43 fixed on the output shaft 42 journaled in the knee 12 so that the shaft 42 will be rotated rapidly at a rapid traverse rate when the clutch 37 is appropriately operated. The mechanism just described consisting of the clutch 37 and the gears 36—43 comprises a rapid traverse transmission located in the knee 12.

The change feed transmission portion of the feed and rapid traverse transmission is indicated generally at 44, and is mounted in the knee 12 and receives its power input from a gear 45 fixed to the shaft 35 which drives a gear 46 mounted on a suitable input shaft 47 of the change feed transmission. Since any conventional change feed transmission may be utilized and the specific details of which form no part of this invention it is believed unnecessary to further describe this transmission 44 in detail. It is believed sufficient to say that power from the input shaft 47 of the change feed transmission 44 passes through the transmission and may be varied to suit the feeds required of the work holders and tool carrier of the machine by means of suitable feed change control levers 44a and 44b connected through suitable shifting mechanism indicated diagrammatically at 44d. The various feed changes selected by levers 44a and 44b pass out through the output shaft 48 of the transmission 44. The output shaft 48 is connected through an overrunning clutch 49 to the common output drive shaft 42 for both the rapid traverse and change feed transmissions so that when the rapid traverse clutch 37 is operated to connect gear 36 to shaft 35, the shaft 42 may be rotated at a much more rapid rate than the speed at which it is normally rotated by the change feed transmission 44. As soon, however, as the rapid traverse clutch 37 is disengaged feed power will automatically be taken up by connection of the shaft 48 through the overrunning clutch 49 to the shaft 42. The mechanism just described consisting of the gears 45—46, input shaft 47, the change speed gear box or transmission 44, output shaft 48, and overrunning clutch 49 comprises a change feed transmission located in the knee. It will thus be apparent that the feed and rapid traverse transmission mechanism in the knee comprises a rapid traverse transmission and a change feed transmission connected in parallel between the input shaft 35 and the output shaft 42 so as to readily effect rapid traverse or feed movements in the output shaft 42. A feed and rapid traverse transmission is thus provided in the knee of the milling machine.

The change feed and rapid traverse movement provided in the shaft 42 may be selectively connected to actuate the knee 12, the saddle 14, the work table 16, and the vertical spindle carrier 18. On this common output drive shaft 42 is provided a pair of gears 50 and 51, Figure 7. The gear 51 drives a gear 52 carried on the table actuating spline shaft 53 journaled in the knee 12 and power from this shaft 53 is transmitted through appropriate bevel gearing 54 and 55 in a conventional manner to the shaft 56 having a bevel gear 57 which engages appropriate reversing bevel gears 58 and 59 for actuating the table screw 60 to effect motions in either direction in the work table 16. An appropriate reversing clutch 61 may be operated by a control lever 62 to initiate the table movement in one direction or the other or to stop said movement.

The gear 52 in turn is connected to drive a gear 63 journaled on the cross feed screw 64 operating in a nut 65 forming part of the saddle 14 so as to effect the traverse movements in the saddle. Also, on the screw 64 is journaled the driving gear 66 which is directly driven from the gear 50 on the shaft 42 so that it rotates in the opposite direction from the gear 63. An appropriate reversing clutch 67 carried in sliding driving relationship on the screw 64 may be shifted by means of a suitable control lever 68 into engagement with either the gear 63 or the gear 66 or to a neutral position to effect reversible operation of the cross feed screw 64 and thereby control the transverse movements of the saddle 14.

The gear 63 also drives a gear 69 and the gear 66 drives a gear 70, both journaled about the elevating drive shaft 71 which is connected through appropriate gearing 72 to the knee elevating screw 73 which effects vertical reciprocation of the knee 12 on the ways 11. An appropriate reversing clutch 74 is slidably mounted in driving relationship on the shaft 71 and may be appropriately engaged with either the gear 69 or the gear 70 or moved to a neutral position by means of a control lever 75 for initiating and controlling the vertical movements of the knee 12.

The vertical movements of the spindle carrier 18 on the ways 17 is controlled from the rapid traverse transmission and the change feed transmission in the knee 12. In the knee 12 is journaled a shaft 76, Figures 1 and 7, having a gear 77 driven by the gear 52. The shaft 76 has appropriate bevel gearing 78 and 79, the latter of which gear is journaled against axial movement in the knee 12 and has a splined bore 79a in which slidably operates in driving relationship the vertical drive shaft 80 for the vertical spindle carrier actuating mechanism, so that the shaft 80 may be driven at all times for any relative vertical position of the knee 12 on the column 10.

Referring more particularly to Figures 2, 3, and 7 the vertical shaft 80 is journaled against axial movement in appropriate bearings 81 and 82 in a bracket 83 which is fixed rigidly to the column 10 and may be considered for the purposes of this invention as forming an integral part thereof. On the upper end of the shaft 80 is formed a bevel gear 84 which drives a pair of reversing bevel pinions 85 and 86 appropriately journaled on suitable sleeves 87, 88 fixed in the housing 83. A shaft 89 is supported in bearings 90, 91, and 92 and at its right hand end Figure 3, in a pilot bearing 93 in the sleeve 88 and has a splined portion 89a upon which is slidingly mounted in driving relationship the reversing and disconnect clutch member 94 which may be selectively engaged with the bevel gear 85 or 86 or moved to a neutral position. In this way reversible driving or stopping of rotation of the shaft 89 may be effected.

On the shaft 89 is formed a worm 95 which engages a worm wheel 96, Figure 4, fixed on a shaft 97 journaled in appropriate bearings 98 and 99 carried in the housing 83. Formed on the inner end of the shaft 97 is a bevel gear 100 which, in turn, drives a bevel gear 101 fixed to the sliding head or spindle carrier elevating nut 102 journaled in suitable bearings 103 and 104 carried in the column 10 of the machine. Operating in the nut 102 is the sliding head or spindle carrier elevating screw 105 appropriately fixed to the spindle carrier 18 by a suitably threaded connection 106. Thus, when the nut 102 is rotated through the transmission gearing just described the screw 105 may be moved upwardly and downwardly and therefore the rigidly attached spindle carrier 18 similarly actuated.

It can, therefore, be clearly seen that by appropriately actuating the rapid traverse clutch 37, Figure 7, or by disconnecting this clutch shaft 42 may be actuated at rapid traverse or various feed rates so as to drive the vertical spindle carrier 18 through the shaft 80 and associated transmission gearing just described to effect similar movements in the head up and down on the guideways 17 in the column 10. Thus, manipulation of the control levers 38 or 39 on the knee will initiate rapid traverse movement or stop the rapid traverse movements and initiate feed movement in the spindle head 18 by operating the connect and disconnect clutch 94, Figure 3, to connect one or the other of the bevel gears 85 and 86. The head 18 may be arrested in movement by moving the clutch 94 to its neutral position. Thus, feed and rapid traverse movements may be applied to the head and controlled by control levers 38 and 39 mounted on the knee 12 of the machine. Feed changes may be made in the transmission 44 in the knee to effect different feed rates for the spindle head 18 by manipulating the control levers 44a and 44b on the knee.

The connect and disconnect clutch 94 for the vertical spindle head movement is actuated by the manual control lever 107 carried on a rock shaft 108, Figures 3, 5 and 6, which has a pinion 109 formed on it which engages a rack 110 formed on the shifter rod 111 slidably mounted in the housing 83 and which extends toward the rear of the machine, Figure 3, where it has fixed upon it a shifter yoke 112 which operates the reversing clutch member 94. Thus, when the lever is in the neutral position 107, shown in Figure 1, the clutch 94 will be in the neutral position as shown in Figure 3. When moved to the position 107a the clutch member 94 will be in engagement with the gear 85 and when moved into the position 107b the clutch 94 will be in engagement with the gear 89 to thus effect reversal or stopping of the driving motion to the worm shaft 89. Associated with the rock shaft 108 is a spring-urged detent plunger 113, Figures 3 and 6, which operates in appropriate detent notches 114 formed in the shaft 108 to assist in locating the positions 107, 107a and 107b and for maintaining the control lever 107 in any of these selected positions.

Associated with the worm shaft 89 is a manual control hand wheel 115 which is automatically disconnected from rotation and held against reengagement with the shaft 89 whenever the power feed or rapid traverse motions are connected to drive the shaft 89. The hand wheel 115, Figure 3, is fixed to a clutch sleeve 116 appropriately journaled on the bearing surface 117 of the shaft 89 and has clutch teeth 118 which may be engaged with mating clutch teeth 119 formed on a clutch sleeve 120 fixed to the worm shaft 89. The hand wheel and sleeve 116 are axially slidable by provision of a clearance space 121a which permits axial shifting of the hand wheel 115 so that when the hand wheel is moved axially to the left, Figure 3, toward the operator the clutch teeth 118—119 will be disengaged and that by moving the hand wheel 115 inwardly toward the machine or to the right in Figure 3, these clutch teeth 118—119 may be engaged so that the worm shaft 89 may be rotated manually by the hand wheel 115. It is obvious that should the hand wheel 115 be allowed to remain connected to the worm shaft 89 when rapid traverse movements were being effected to actuate the spindle carrier 18 when manipulating the lever 38 or 39, Figure 7, that the rapid rotation of the shaft 89 and hand wheel 115 might cause injury or accident to the operator.

Automatic means is provided so that when the control lever 107 is moved to either position 107a or 107b to permit power driving of the spindle carrier 18 that the hand wheel 115 will be automatically shifted axially to disengage the clutch 118—119. This mechanism may comprise a pinion 121, Figure 3, journaled on a stud 122 fixed in the housing 83 which engages a rack 123 formed on the plunger 113 and which engages a circular rack 124 formed on a sleeve 125 slidably mounted on the worm shaft 89. Passing through a diametral slot 126 formed in the worm shaft 89 is an actuating cross pin 127 fixed to the sleeve 125 which abuts against a plunger 128 slidably mounted in a central bore 129 formed in the shaft 89. The plunger 128, in turn, engages a second cross pin 130 extending through a diametral slot 131 formed in the shaft 89 and which is fixed in a shifter collar 132 slidably mounted on the shaft 89 and adapted to engage the sleeve 116 of the hand wheel 115.

It will, therefore, be obvious that upon rocking of the shaft 108 in manipulating the control lever 107 that the detent plunger 113 will be likewise reciprocated axially by the detent notches 114, causing rocking of the pinion 121 and axial sliding of the sleeve 125 on the shaft 89 which motion through the pin 127, plunger 128, cross pin 130 and the shifter collar 132 will cause the clutch sleeve 116 and its associated hand wheel 115 to be moved axially so as to automatically disengage the clutch teeth 118—119 whenever the lever is moved to either of the positions 107a and 107b, the detent 114 corresponding to these two operative positions being of sufficient radial distance from the axis of rotation of the rock shaft 108 as to cause greater axial displacement of the plunger 113 than the neutral central position. When the control lever is in the central position 107 the operator may push the hand wheel 115 in to reengage the clutch members 118 and 119 for manual operation of the shaft 89.

Means are provided for tripping the clutch 94 and the control lever 107 from either of its operative positions 107a, 107b so as to automatically stop the upward and downward movement in either feed or rapid traverse of the spindle carrier 18. This mechanism comprises a pair of dogs 133 and 134 adjustably mounted in a vertical guideway 135 by appropriate bolts 136. These dogs 133 and 134 have abutment surfaces 133a and 134a which respectively engage the ends of a trip plunger 137 slidably mounted in a vertical bore 138 formed in the housing 83 and having a rack 139 formed thereon which engages the pinion portion 109 formed on the rock shaft 108. Thus, as the spindle head moves upwardly under power the abutment surface 133a of the lower dog 133 will engage the plunger 137 and move the rock shaft 108 into its neutral position. Similarly, downward movement of the head will be limited when the surface 134a of the upper dog 134 similarly strikes the plunger 137 to rock the shaft 108 back to its neutral position.

Figure 8:
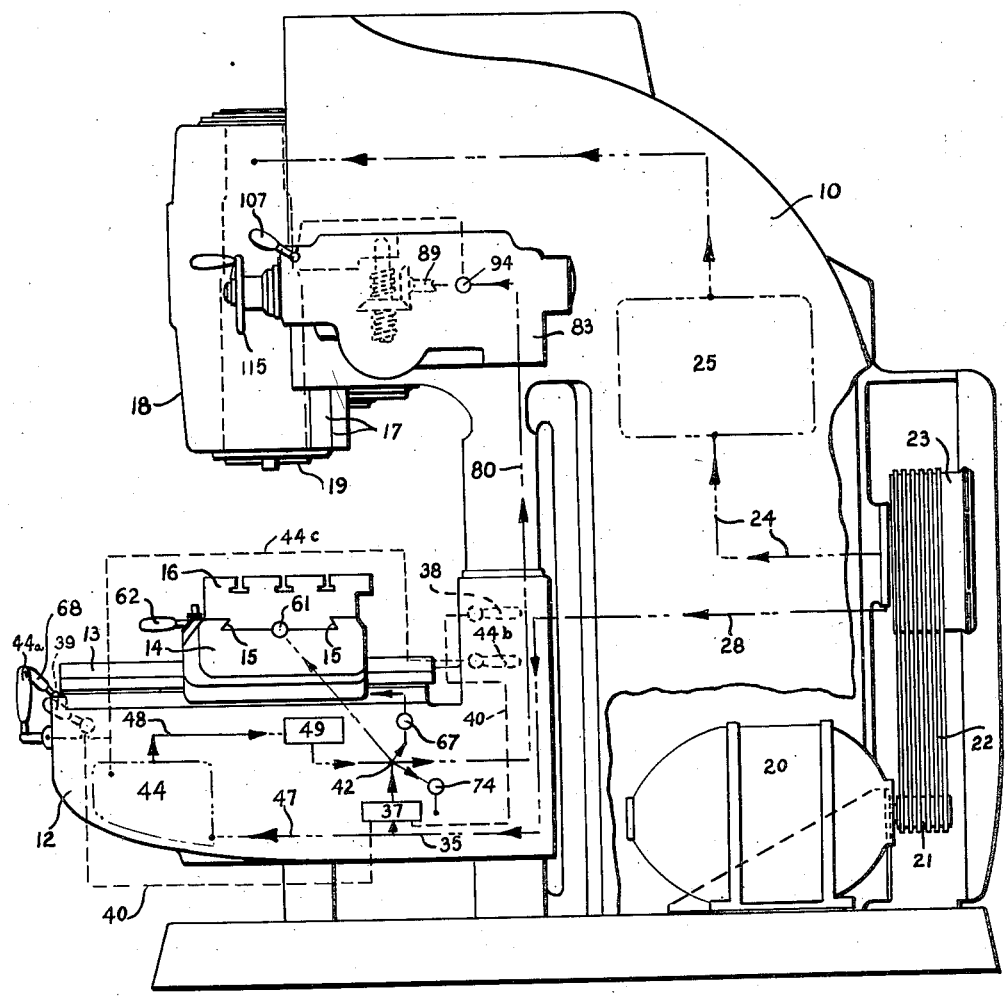
Figure 8 is a diagrammatic view showing the direction of power flow in the milling machine organization incorporating this invention and the associated control mechanisms for directing this power flow as desired.

Referring particularly to Figure 8 wherein is shown diagrammatically the flow of power from the prime mover 20 to the various actuable elements of the milling machine, it will be noted that power from the prime mover 20 is utilized to rotate the cutter spindle 19 which is connectable by means of the clutch pulley 23 through the output shaft 24 and the change speed transmission 25 in the column 10 for rotating the cutter spindle 19 at any desired speed. It is also to be noted that all feed and rapid traverse driving power for the knee, saddle, table and spindle carrier 18 is derived from the continuously running pulley 23 driven by the prime mover 20 and passes through a single transmission means including shaft 28—31 from the column to the input drive shaft 35 in the knee 12. Power from the input shaft 35 in the knee then divides, part of it going through the rapid traverse transmission and clutch 37 thereof to the common output drive shaft at the point 42, while the other portion of the power transmitted from the shaft 35 passes through the change feed transmission 44 located in the knee through the overrunning clutch 49 and arrives also at the common point 42. It will be noted that this common point or shaft 42 serves as the feed and rapid traverse power supply point for the knee, saddle, table and spindle carrier. It is to be further noted that each of the power transmission lines from the point 42 has a reversing and disconnecting clutching device for rendering the feed and rapid traverse power derived from the common point 42 selectively effective for each one or group of the knee, saddle, table and spindle carrier of the machine. It is to be further noted that the control of all of these four movable members, the knee, saddle, table and spindle carrier, is effected in rapid traverse movement by control mechanism comprising the levers 38 and 39 on the knee and effected in variable feed rates by the control levers 44a and 44b on the knee. Thus all feed and rapid traverse movements of said four movable members of the machine are controlled from control apparatus on the knee.

There has thus been provided an improved feed and rapid traverse transmission for a sliding head vertical spindle milling machine in which a feed and rapid traverse transmission located in the knee is driven from the prime mover for rotating the cutter spindle by a single constantly rotating drive shaft connecting power from the prime mover in the column to the feed and rapid traverse transmission in the knee; and further that feed and rapid traverse power from said transmission is conveyed to a common point in the knee from which it may be dispatched to effect desired feed and rapid traverse movements in the knee, saddle, table and spindle carrier of the machine; and still further to provide control apparatus for the feed changes and the rapid traverse movement located on the knee for obtaining the desired rates of relative movement of the knee, saddle, table, and spindle carrier.

What is claimed is:

In a milling machine having a column, a knee and a spindle carrier slidably mounted on the column for movement toward and from one another, a saddle and table mounted on the knee, a spindle journaled in the carrier, the combination of transmission and control means for the different parts including a prime mover mounted in the column, a clutch for connecting the prime mover for actuation of the spindle, a common drive shaft in the knee coupled for continuous operation with the prime mover exclusive of said clutch, a variable feed transmission and a rapid traverse train mounted in the knee for actuation by said drive shaft, a common output shaft journaled in the knee, means for selectively coupling the output shaft for actuation by the feed and transmission and rapid traverse train, means coupling the output shaft for actuation with the carrier including a reversing clutch having a neutral position, a transmission train to the carrier including a shaft controlled by said clutch, a hand wheel for rotating said shaft and control means including a pinion, a three-position trip operable member rack connected to the pinion, a shifter for said clutch rack connected to the pinion, a detent responsive to rotation of the pinion, means operable by the detent for disengaging the hand wheel regardless of the direction of rotation of the pinion and a manual controlled lever connected to the pinion whereby all the controls are interlocked through said pinion and said carrier may be translated regardless of rotation of the spindle.

EDGAR D. VANCIL
FRED A. HASSMAN

REFERENCES CITED

The following references are of record in the file of this patent:

UNITED STATES PATENTS

| Number | Name | Date |
| --- | --- | --- |
| 1,670,413 | Kniedl | May 22, 1928 |
| 1,968,276 | Armitage | July 31, 1934 |
| 1,976,136 | Nenninger | Oct. 9, 1934 |
| 2,182,421 | Armitage | Dec. 5, 1939 |
| 2,217,671 | Coffin et al. | Oct. 15, 1940 |
| 2,308,647 | Curtis | Jan. 19, 1943 |
| 2,327,404 | Curtis | Aug. 24, 1943 |
| 2,344,529 | Armitage | Mar. 21, 1944 |
| 2,393,928 | Nenninger et al. | Jan. 29, 1946 |